Nov. 2, 1965 R. F. SWENSON ETAL 3,215,468
SEAT FOR MATERIAL HANDLING VEHICLES
Filed March 1, 1965 2 Sheets-Sheet 1
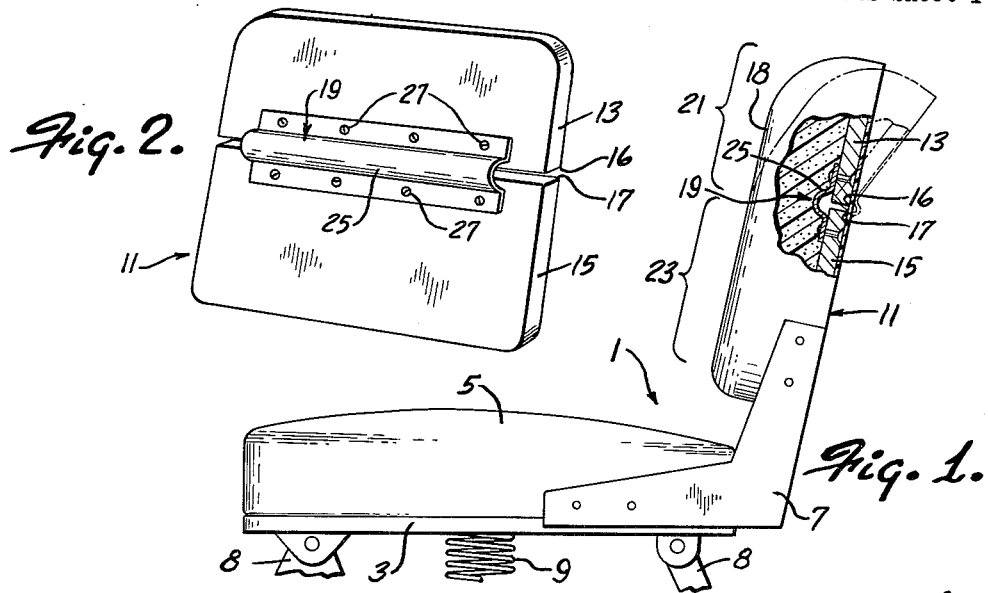
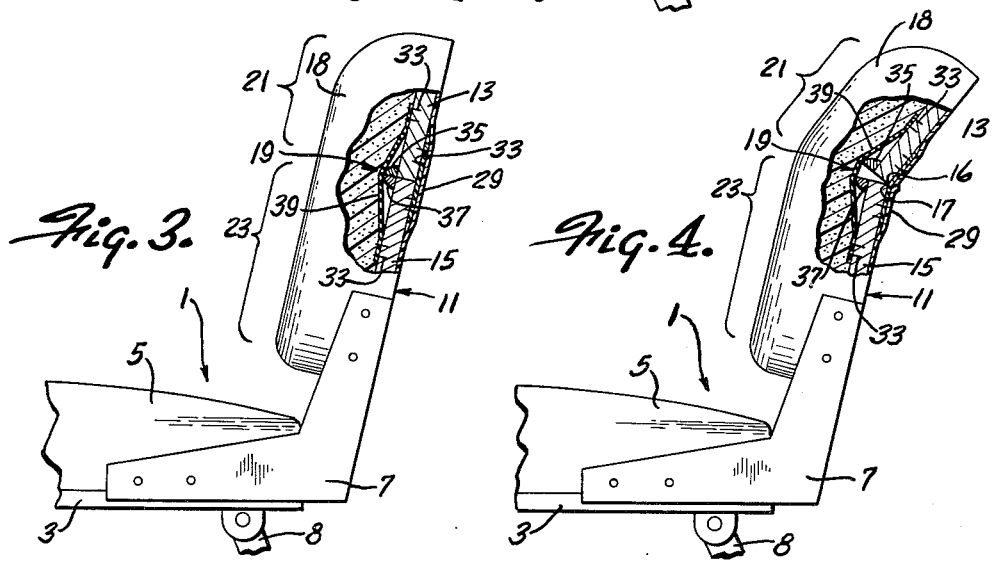
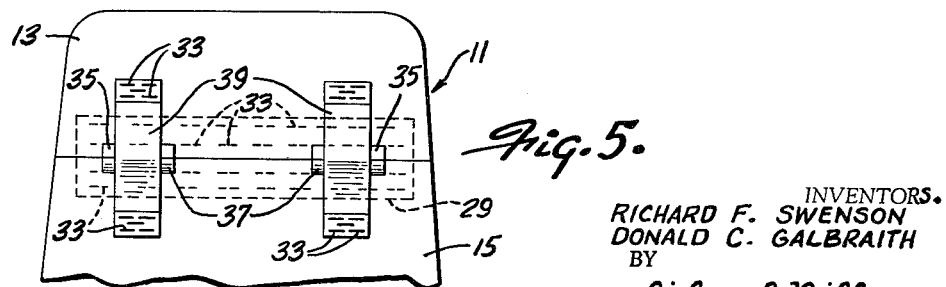
INVENTORS.
RICHARD F. SWENSON
DONALD C. GALBRAITH
BY
Lieber & Nilles
ATTORNEYS Nov. 2, 1965   R. F. SWENSON ETAL   3,215,468
SEAT FOR MATERIAL HANDLING VEHICLES
Filed March 1, 1965   2 Sheets-Sheet 2
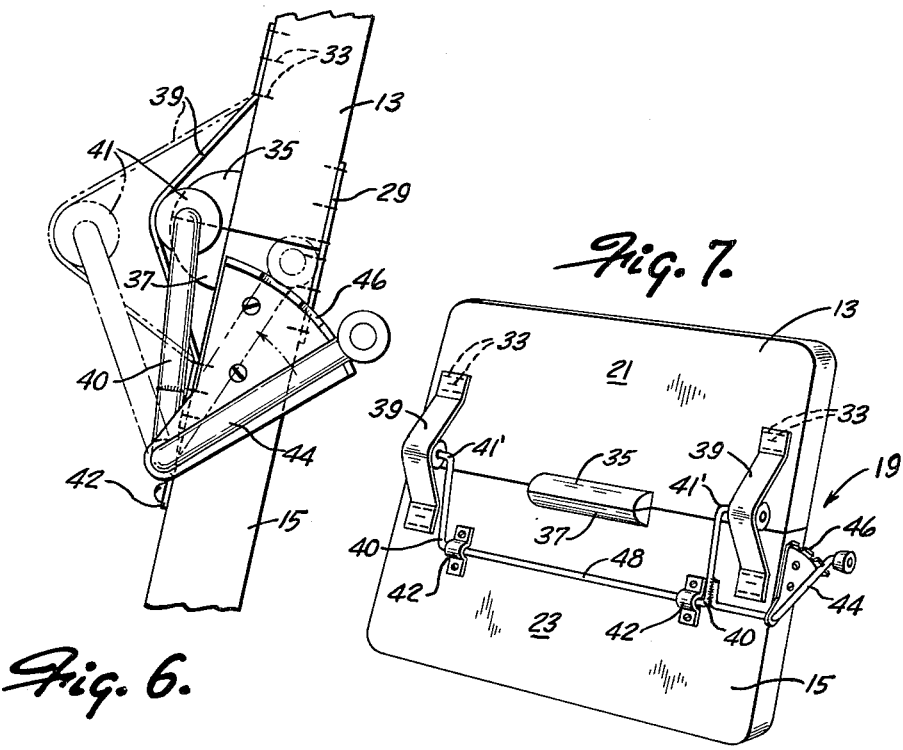
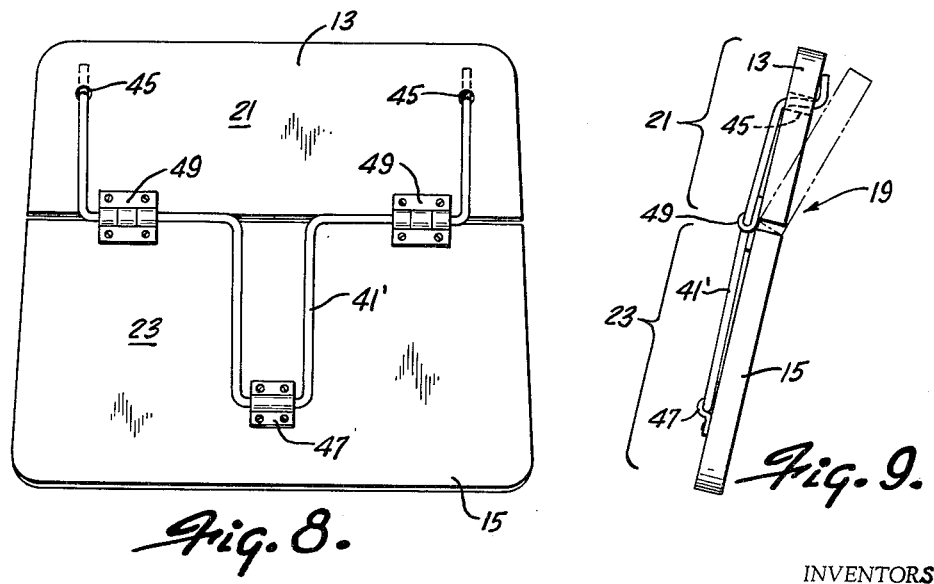
INVENTORS.
RICHARD F. SWENSON
DONALD C. GALBRAITH
BY
Lieber & Nilles
ATTORNEYS

United States Patent Office 3,215,468
Patented Nov. 2, 1965

3,215,468
SEAT FOR MATERIAL HANDLING VEHICLES
Richard F. Swenson, Medina, Tex., and Donald C. Galbraith, Milwaukee, Wis., assignors to Milsco Manufacturing Co., Milwaukee, Wis., a corporation of Wisconsin
Filed Mar. 1, 1965, Ser. No. 435,820
9 Claims. (Cl. 297—284)

This invention relates to an improved operator's seat for material handling equipment. As such, it may find application on cranes, shovels, fork lift trucks, and other such vehicles.

In the past, seating for such vehicles has proven a source of operator fatigue and discomfort. The stiff suspension and start-stop operation of such vehicles and the rough surfaces over which the vehicles are required to operate make it difficult to provide comfortable seating to the operator over extended periods of time. Attempts to provide such satisfactory seating have generally centered around providing proper support and distribution of body weight by means of a rigidly constructed seat, molded, insofar as possible, to the body contours of the operator. For added comfort, a high back has been employed with such seats to support the back of the operator.

While such seats provide support, they also restrict the movement of the operator. Such restriction is particularly apparent during operations wherein the operator is required to look up, as when determining the correct positioning of loads or the clearance of obstacles. The rigid construction and high back of the seat require him to obtain elevated vision by bending backward at the neck. Not only does this create additional problems in operator fatigue, in addition, the range of elevated vision that can be obtained in this manner is extremely limited.

There have been numerous attempts in the prior art to provide comfortable seating to the operator while at the same time permitting elevated vision. For example, the entire seat may be tiltably mounted on the material handling equipment to allow the operator to pivot it rearwardly to look up. However, in such an arrangement, when the entire seat tilts back, the operator's feet and hands may be shifted or removed from the controls of the vehicle, inadvertently altering the operation of it. Additionally, if the seat was positioned in the normal operating position firmly enough for comfortable, non-fatiguing operation of the vehicle, it required a large force to tilt it rearward to obtain elevated vision.

Attempts to overcome the disadvantages of the tilting seat arrangement have included providing a seat having a spring-loaded, tilting back rest mounted at the base of the seat. Again, however, if the spring-loading mechanism was weak enough to permit easy tilting, it did not provide sufficient support to the back of the operator under normal operating conditions. In another version, the pivoted back rest was mounted on a rigid positioning support, and only the back rest itself pivoted. However, when the back rest was pivoted as the operator leaned back, the bottom edge forced the lower portion of the operator's spine forward pushing the operator into a slouched position.

Accordingly, the present invention provides a seating means giving the operator firm, comfortable support during normal operation of a material handling vehicle while permitting him to obtain elevated vision in a non-fatiguing manner. As such, the invention provides an operator's seat which comprises a padded seat portion having a rigidly mounted padded back rest, providing firm, comfortable support to the operator during normal operation of the material handling vehicle. Additionally, the upper portion of the back rest is pivotally mounted on the lower portion to permit it to tilt rearwardly when desired. This allows the upper body of the operator to bend backward when looking up without having to bend the neck, alleviating fatigue in the neck. Several means are provided to mount the upper portion of the back rest on the lower portion.

The present invention also provides a means to regulate the amount of force required to tilt the upper portion of the back rest, permitting the seat to be adjusted to suit each individual operator. Means are also provided to retain the seat in the normal operating position and prevent the upper portion of the back rest from tilting forward.

The present invention further provides for varying the density of the padding on the seat and back rest so that the sides are firmer than the center and the bottom portion of the back rest firmer than the upper portion. This provides further comfort to, and better containment of, the operator.

The invention may be better understood by reference to the following specification and drawings, forming a part thereof, in which:

FIGURE 1 is a fragmentary part-sectional side view of a typical vehicle operator's seat embodying the invention and showing the upper section of the back rest in its tilted position in dot-and-dash lines;

FIGURE 2 is a front and side perspective view of the back rest portion of the seat of FIGURE 1 with the cover and padding removed therefrom;

FIGURE 3 is a fragmentary part-sectional side view of a seat embodying a somewhat modified form of the invention;

FIGURE 4 is similar view showing the upper section of the back rest portion of the seat of FIGURE 3 in tilted position;

FIGURE 5 is a plan view of the back rest portion of the seat of FIGURES 3 and 4 with padding and covering again removed;

FIGURE 6 is another fragmentary side view of the back rest portion of the seat of FIGURE 3 with the cover and padding removed and showing a tension adjusting mechanism for the back rest;

FIGURE 7 is a front and side perspective view of the back rest and adjustment means of FIGURE 6;

FIGURE 8 is a plan view of a seat back rest with padding and covering removed and embodying a further modified form of the invention; and FIGURE 9 is a side elevation of the seat back rest of FIGURE 8 again illustrating the tilting action of the upper section by means of dot-and-dash lines.

Referring now to FIGURE 1, the numeral 1 indicates an operator's seat of the present invention. The seat comprises a seat portion 3 having a padded cushion, 5, the seat being affixed to a vehicle (not shown) as by means of brackets 8 and a spring 9 in a well known manner. On the rear of seat portion 3 is mounted a pair of brackets 7 to support the back rest 11 of the operator's seat 1.

In accordance with the invention, back rest 11 comprises a pair of longitudinally aligned, rigid upper and lower base members or sections 13, 15 having a covered padded cushion 18 mounted thereon. The lower section or member 15 is secured to the supporting brackets 7 on either side of seat portion 3. The pair of base members 13, 15 are joined by a spring hinge means 19 to form relatively articulatable upper and lower back rest portions 21 and 23.

As shown in FIGURES 1 and 2, the hinge means 19 in one form of the invention may be in the nature of a spring-steel member 25 riveted or otherwise secured to members 13, 15 as at 27. The spring-steel member 25 is sufficiently rigid to hold members 13 and 15 in the aligned position and to normally prevent upper back rest portion 13 from pivoting forward. Although shown as a single spring member 25, it is to be understood that hinge means 19 may be a plurality of smaller spring members.

When it is desired to look upward or overhead, the operator bends the upper portion of his body backward in a natural motion. This causes the upper back rest portion 21 to swing or tilt rearwardly and downwardly until the rear edges of members 13, 15 come in contact. The upper back rest section or portion 21 then pivots rearward on lower back rest portion 23 the amount required by the operator to obtain the necessary elevated vision with the edges 16, 17 acting as the fulcrum. The tilted position of the upper back rest portion 21 is shown in phantom in FIGURE 1.

To return the upper back rest section 21 to its normal position, the operator merely leans forward assuming his or her natural position, and spring-steel hinge member 25 returns the member 12 to its aligned position with respect to member 15.

It will be appreciated that the above described operator's seat provides firm support to the operator during normal operation by providing a cushioned seat portion having a lower back rest section fixedly mounted thereon and an upper articulatable back rest section normally held stiffly in alignment with the lower section by a spring hinge means. The upper and lower sections of the back rest may be covered by a single cushion and a common flexible cover, and as described, the seat permits the operator to look up upon tilting back the upper back rest portion.

The support provided by the above described seat construction may be augmented by varying the density of the padding in cushions 5 and 18. Specifically, the padding on the seat portion may be made denser or harder along the sides than in the center and denser in the lower section of the back rest portion than in the upper section. This further serves to provide comfortable seating to the operator.

FIGURES 3, 4, 5, 6 and 7 show another embodiment of the operator's seat of this invention. Elements of this construction similar to those of the embodiment of FIGURE 1 are labeled with identical numbers. However, the embodiment in FIGURES 3 to 7 provides a different form of hinge means 19. This form employs a strap or similar member 29 joining the upper and lower base members 13, 15 together on the side opposite cushion 17. Member 29 may be rubberized cloth or plastic strip which permits the upper back rest section 21 and member 13 to pivot rearwardly on fixed member 15 or it may be in the nature of a piano or other hinge.

The flexible strap 29 or the like may be fastened to members 13, 15 as by staples 33, and a pair of quarter-round stops 35, 37 are mounted on the abutting edges of members 13, 15 respectively. These stop prevent upper back rest portion 21 from pivoting forward and normally retain the upper back rest section 21 and lower back rest section 23 in their aligned position. As shown in FIGURE 5, a plurality of such stops may be employed. Over each pair of stops 35, 37 is stretched a resilient rubberized plastic strip 39 or the like which is adapted to stretch and which is secured to the members 13, 15 as by staples 33. These straps provide the spring tension necessary for the operation of seat 1.

FIGURE 4 shows the embodiment of the invention just described but with the upper section 21 in the rearwardly tilted position. When the operator leans the upper portion of his body backward, the upper back rest section 21 pivots rearwardly on member 15, and again, the edges 16, 17 act as fulcrums. In this embodiemnt, the rubberized straps 39 are thus stretched across the stop members 35, 37 providing sufficient tension to support the operator comfortable in this position. When it is desired to return back rest 11 and the upper section 21 thereof to its normal position, the operator merely leans forward, and straps 39 automatically pull the upper back rest section 21 into the aligned position as determined by stops 35, 37.

FIGURES 6 and 7 show a form of hinge means 19 in which the tension of straps 39 may be adjusted to regulate the amount of force required to tilt the upper portion 21 of the back rest rearwardly. Quarter-round stops 35, 37 are mounted in abutting relation in the center of base members 13, 15 as in the case of the device just described with reference to FIGURES 3 to 5. However, in this case, a cam shaft or the like rotatably supported by brackets 42 has the eccentric portion 41 positioned under each strap. The tension of the straps 39 may be varied by rotating the eccentric 40 as by means of a lever or crank 44 affixed thereto. A suitable lock such as a notched bar 46 may be provided to retain lever 44 and eccentric 40 in the desired position, and the crank may be joined as by welding to the pivot portion 48 of the eccentric 40 to permit the use of a single crank or lever 44.

FIGURES 8 and 9 show yet another embodiment of the present invention. In this embodiment, the spring tension necessary to hold the upper back rest section 21 and the lower back rest section 23 in alignment and to return them to the aligned position from the tilted position is provided by a torsion spring 41′. Torsion spring 41′ may be mounted on the member 13 as by placing the hooked ends 43 of torsion spring 41′ in holes 45 prior to assembly of member 13 and member 15. Torsion spring 41′ is then affixed to member 15 by means of bracket 47. A pair of hinges 49 are mounted on members 13, 15 and employ the torsion spring 41′ as the hinge pin to thereby join members 13, 15 together.

The operation of the embodiment shown in FIGURES 8 and 9 is similar to that previously described. That is, the upper back rest section 21 pivots about hinge members 49 to provide overhead vision to the operator.

Various modes of carrying out the invention are contemplated as being within the scope of the following claims particularly pointing out and distinctly claiming the subject matter which is regarded as the invention.

We claim:

1. A vehicle seat assemblage comprising, a seat member, a back rest member having a lower section mounted on said seat member, said back rest member also having an upper back rest section, resilient hinge means joining the lower back rest section and the upper back rest section to permit the upper back rest section to swing rearwardly relative to the lower back rest section from a normally longitudinally aligned position, and means coacting with said lower and upper back rest sections to prevent forward swinging movement of said upper back rest section beyond its normal aligned position.

2. A vehicle seat assemblage according to claim 1, wherein the upper back rest section is supported on the lower back rest section by the hinge means in a manner whereby the adjacent rear edges of said upper and lower sections cooperate to provide the fulcrum for the upper section as it is swung rearwardly relative to the lower section.

3. A vehicle seat assemblage according to claim 2, wherein a common cushion and covering therefor is provided for the back rest member, said cushion and covering extending over both the upper and the lower back rest sections.

4. A vehicle seat assemblage according to claim 1, wherein the resilient hinge means is formed by at least one metallic leaf spring secured to both the upper and the lower back rest sections.

5. A vehicle seat assemblage according to claim 1, wherein the resilient hinge means is formed by at least one flexible strap member secured to both the upper and lower back rest sections and cooperating with a pair of abutments carried by the respective upper and lower sections to provide the means for preventing forward swinging movement of the upper back rest section beyond its normal aligned position.

6. A vehicle seat assemblage according to claim 5, wherein means is additionally provided for adjusting the tension of the hinge forming straps.

7. A vehicle seat assemblage according to claim 6, wherein the means for adjusting the tension of the hinge forming straps is in the nature of an eccentric cooperating with said straps and rotatable relative thereto to various predetermined positions.

8. A vehicle seat assemblage according to claim 5, wherein the sections are also joined by a flexible strap attached to the upper and lower sections on the side thereof remote from the first mentioned hinge forming straps.

9. A vehicle seat assemblage according to claim 1, wherein the resilient hinge means is formed by a torsion spring secured to the upper and lower back rest sections and normally retaining said upper and lower sections in longitudinally aligned position, said torsion spring also having medial portions thereof carrying hinges permitting pivotal movement of the upper back rest section relative to the lower back rest section.

References Cited by the Examiner

UNITED STATES PATENTS

| 2,685,327 | 8/54 | Pitman | 297—284 |
| 2,981,314 | 4/61 | Eklof et al. | 297—284 |
| 3,057,660 | 10/62 | Schneider | 297—312 |
| 3,121,592 | 2/64 | Anderson | 297—284 |

FOREIGN PATENTS

| 1,303,089 | 7/62 | France. |
| 699,721 | 11/53 | Great Britain. |
| 257,094 | 2/28 | Italy. |

FRANK B. SHERRY, *Primary Examiner.*